(12) United States Patent
O'Loughlin

(10) Patent No.: US 7,999,524 B2
(45) Date of Patent: Aug. 16, 2011

(54) INTERLEAVED POWER FACTOR CORRECTION PRE-REGULATOR PHASE MANAGEMENT CIRCUITRY

(75) Inventor: Michael J. O'Loughlin, Nashua, NH (US)

(73) Assignee: Texas Instruments Incorporated, Dallas, TX (US)

( * ) Notice: Subject to any disclaimer, the term of this patent is extended or adjusted under 35 U.S.C. 154(b) by 379 days.

(21) Appl. No.: 12/228,744

(22) Filed: Aug. 15, 2008

(65) Prior Publication Data

US 2008/0316783 A1 Dec. 25, 2008

Related U.S. Application Data

(63) Continuation-in-part of application No. 12/133,080, filed on Jun. 4, 2008, now abandoned.

(60) Provisional application No. 60/941,844, filed on Jun. 4, 2007.

(51) Int. Cl.
*G05F 1/575* (2006.01)
*H02M 3/335* (2006.01)

(52) U.S. Cl. .......................... 323/272; 323/266

(58) Field of Classification Search .................. 323/205, 323/207, 225, 266, 272, 284; 363/65, 89, 363/21.04
See application file for complete search history.

(56) References Cited

U.S. PATENT DOCUMENTS

| | | | |
|---|---|---|---|
| 3,767,998 A | 10/1973 | Beling | |
| 4,245,185 A | 1/1981 | Mitchell et al. | |
| 4,479,160 A | 10/1984 | Stacey | |
| 5,793,191 A | 8/1998 | Elmore et al. | |
| 6,495,995 B2 | 12/2002 | Groom et al. | |
| 6,744,647 B2 | 6/2004 | Cohen | |
| 6,771,052 B2 | 8/2004 | Ostojic | |
| 6,906,536 B2 | 6/2005 | Pearce et al. | |
| 6,922,044 B2 | 7/2005 | Walters et al. | |
| 6,995,548 B2 | 2/2006 | Walters et al. | |
| 7,085,116 B2 | 8/2006 | Kudo et al. | |
| 7,218,494 B2 | 5/2007 | Kudo et al. | |
| 7,265,522 B2 | 9/2007 | Sutardja et al. | |
| 7,282,896 B2 | 10/2007 | Moussaoui et al. | |
| 7,282,897 B2 | 10/2007 | Moussaoui et al. | |
| 7,453,248 B2 * | 11/2008 | Takeuchi | 323/285 |
| 7,489,532 B2 * | 2/2009 | Shih | 363/89 |

(Continued)

OTHER PUBLICATIONS

"Standalone Power Factor Correction (PFC) Controller in Continuous Conduction Mode (CCM)," Datasheet, V1.3, Infineon Technologies, Feb. 6, 2007, pp. 1-23.

(Continued)

*Primary Examiner* — Gary L Laxton
(74) *Attorney, Agent, or Firm* — William B. Kempler; Wade J. Brady, III; Frederick J. Telecky, Jr.

(57) ABSTRACT

Methods for power factor correction (PFC) and for reducing conduction losses and switching losses in a power converter as well as the power converter and phase management circuitry for the power converter. The power converter includes a first PFC pre-regulator interleaved with at least one additional PFC pre-regulator, and a step down converter. The average input power is measured downstream of the front end at the step down converter and the average current sense signal is compared to a reference voltage. Each additional PFC pre-regulator is disable when output power generated by the front end is less than a first pre-designated rated power level and each additional PFC pre-regulator is enabled when the output power is greater than a second pre-designated rated power level.

16 Claims, 3 Drawing Sheets

U.S. PATENT DOCUMENTS

2007/0262756 A1  11/2007  Valley et al.

OTHER PUBLICATIONS

"Compact Fixed Frequency Discontinuous or Critical Conduction Voltage Mode Power Factor Correction Controller," On Semiconductor Publication NCP 1601A, NCP1601B, Semiconductor Components Industries, LLC, Dec. 2005, pp. 1-18.

"Advanced Transistion-Mode PFC Controller," STMicroelectronics, Mar. 2007, pp. 1-18.

Design of Power Factor Correction Circuit Using FAN7529, Fairchild Semiconductor Corporation, Application Note AN-6026, Oct. 16, 2006, pp. 1-39.

Office Action from U.S. Appl. No. 11/799,190 mailed Jun. 24, 2009.
Office Action from U.S. Appl. No. 11/799,190 mailed Dec. 18, 2009.
Office Action from U.S. Appl. No. 11/799,190 mailed Sep. 27, 2010.

* cited by examiner

INTERLEAVED POWER FACTOR CORRECTION PRE-REGULATOR PHASE MANAGEMENT CIRCUITRY

CROSS REFERENCE TO RELATED APPLICATIONS

This patent application is a continuation-in-part of U.S. patent application Ser. No. 12/133,080 of the same title filed on Jun. 4, 2008 and claims priority from U.S. Provisional Patent Application No. 60/941,844 also of the same title filed on Jun. 4, 2007.

STATEMENT REGARDING FEDERALLY SPONSORED RESEARCH OR DEVELOPMENT

Not Applicable

BACKGROUND OF THE INVENTION

Interleaved power factor correction techniques are being used, primarily, to reduce conduction losses in connection with power factor correction (PFC) pre-regulators and to increase power densities by reducing total inductor magnetic volume. Interleaving PFC pre-regulators, in which two or more PFC pre-regulators are operated out-of-phase, is commonly employed in applications such as—for the purpose of illustration and not limitation—power supplies for personal computers, computer server power supplies, and in industrial AC to DC power conversion.

Efficiency improvements using interleaved techniques, however, are only observed at higher power levels where conduction losses dominate over switching losses. However, this technique increases parasitic switch/field-effect transistor (FET) capacitance, which increases switching losses and reduces light load efficiency.

For example, referring to FIG. 1, a typical AC to DC converter 10 with interleaved PFC pre-regulators includes a first stage (Stage 1) structured and arranged to provide interleaved PFC AC to DC conversion and a second stage (Stage 2) structured and arranged to provide DC to DC conversion. The first stage includes a first PFC pre-regulator 12 (Phase 1) and at least one additional PFC pre-regulator 14 (Phase 2) that are interleaved. The number of additional pre-regulator 14 is related to the number of desired phases. Hence, a two phase system (as shown in FIG. 1) will have a first PFC pre-regulator 12 (Phase 1) interleaved with a second PFC pre-regulator 14 (Phase 2); while and a three phase system (not shown) will have a first PFC pre-regulator 12 interleaved with a second PFC pre-regulator 14 and with a third PFC pre-regulator (not shown).

The interleaved PFC pre-regulators 12 and 14 are adapted to provide AC to DC power conversion. Each of the interleaved pre-regulators 12 and 14 is structured and arranged to include an inductive element L1 and L2 and a current blocking device, such as diode D1 and D2. Those of ordinary skill in the art can appreciate that other means of blocking current besides diodes can be used.

In pertinent part, each of the interleaved PFC pre-regulators 12 and 14 further includes a switching device 13 and 30, which is shown as field effect transistors (FETs) Q1 and Q2, and a gate driving device 11 and 28. The gate driving devices 11 and 28 are adapted for opening, i.e., turning OFF, and closing, i.e., turning ON, the corresponding gates of the switching devices 13 and 30. Those of ordinary skill in the art can appreciate that other switching device types can also be used.

The front end (AC to DC conversion) stage (Stage 1) of the power converter 10 is generally followed by a second downstream (DC to DC conversion) stage (Stage 2). The second stage includes a peak current mode controlled step down converter 16, such as a step down converter, a fly-back converter, and the like, that is adapted to step down the regulated boost voltage ($V_{BOOST}$) to a more usable voltage. The step down converter 16 includes a transformer 19, a current sense resistor 17, and a switching device 15. For simplicity, efficient operation of the step down converter 16 can be controlled using peak current mode control techniques that are known to the art.

A problem with this configuration, however, is that, at lighter power loads, conduction losses are negligible and switching losses dominate. Recalling that, heretofore, interleaving PFC pre-regulators have been used to reduce conduction losses, traditional interleaving of PFC pre-regulators 12 and 14 reduces efficiency at lighter power loads.

To improve efficiency at these lighter power loads and to reduce switching losses, it would be desirable to provide means and methods for selectively turning OFF the second PFC pre-regulator 14 and any other PFC pre-regulators (not shown) during instances of lighter power loads and turning ON or leaving ON the additional PFC pre-regulator(s) 14 during instances of higher power loads.

SUMMARY OF THE INVENTION

Methods for power factor correction (PFC) and for improving efficiency of a power converter at lighter power loads are disclosed. Also disclosed are power converters and phase management circuitry for power converters. The power converter includes a first PFC pre-regulator that is interleaved with at least one additional PFC pre-regulator, and a downstream step down converter. The phase management circuitry is structured and arranged to measure the average input power downstream of the front end, which is to say at the step down converter. The average current signal is processed and compared to a reference voltage. The phase management circuitry disables each of the at least one additional PFC pre-regulators when the output power generated by the step down converter is less than a first pre-designated rated power level, resulting in single mode or single phase operation, and enables each of the at least one additional interleaved PFC pre-regulator when the output power generated by the step down converter is greater than a second pre-designated rated power level, resulting in multiple mode or multiple phase operation.

DESCRIPTION OF THE DRAWINGS

The invention will be more fully understood by reference to the following Detailed Description of the invention in conjunction with the Drawings, of which.

DETAILED DESCRIPTION

U.S. Provisional Patent Application No. 60/941,844 filed on Jun. 4, 2007 and U.S. patent application Ser. No. 12/133,080 filed on Jun. 4, 2008 are incorporated herein in their entirety by reference.

Figure 1:
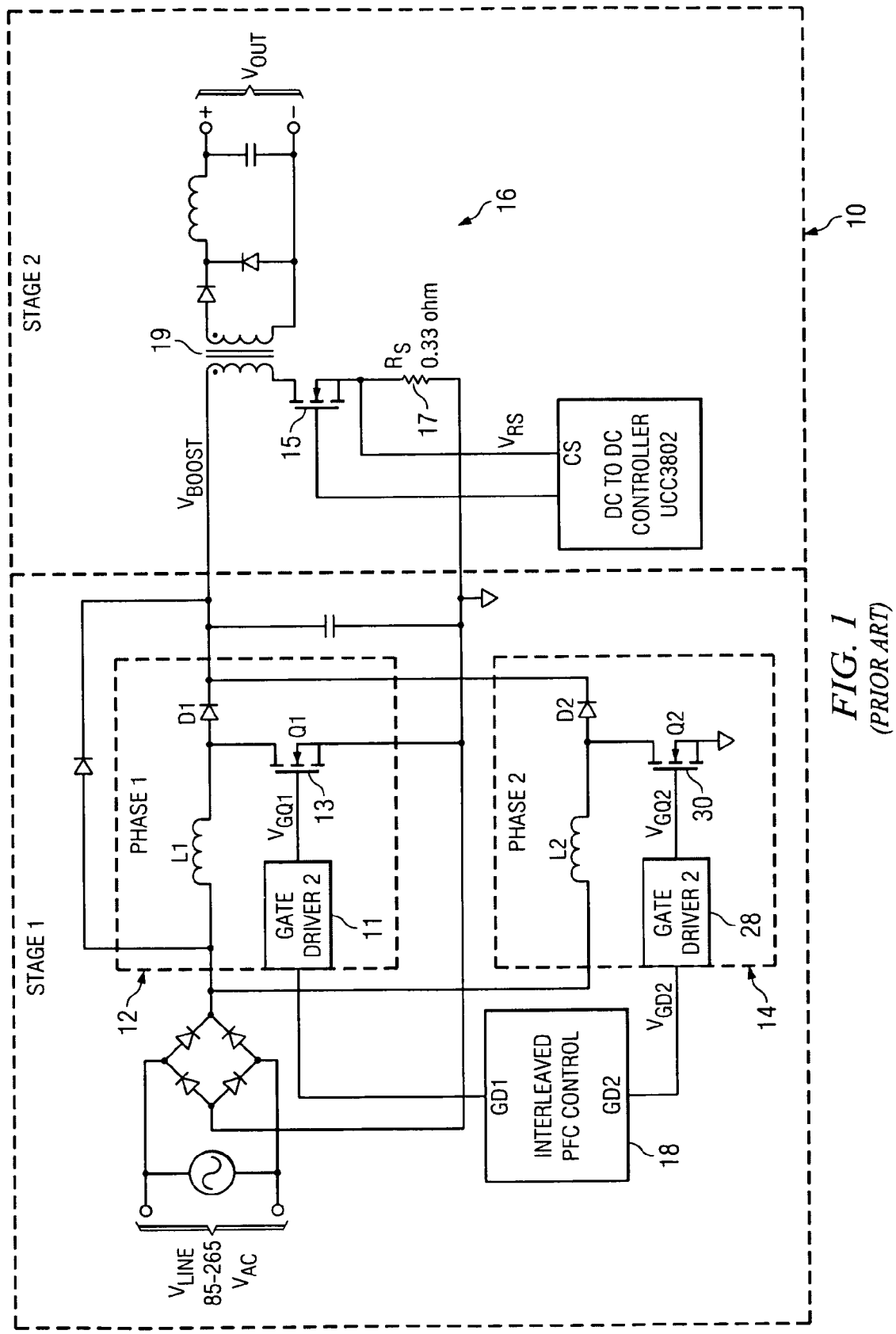
FIG. 1 shows a schematic of a two stage off line power converter having an interleaved power factor correction pre-regulator front end and a downstream step down converter in accordance with the prior art.
Figure 2:
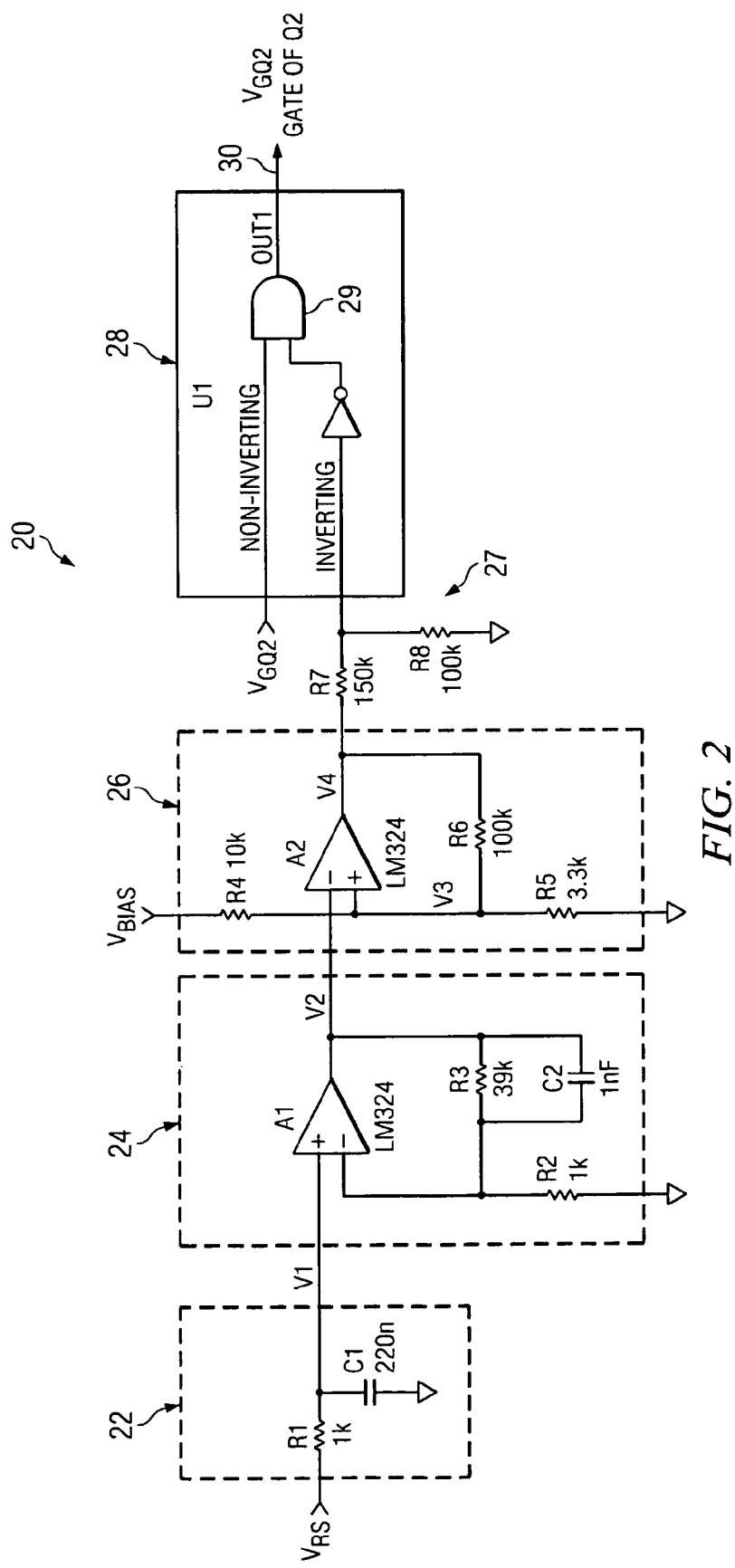
FIG. 2 shows a schematic of phase management circuitry for power factor correction in accordance with the present invention.

Phase management circuitry and a power converter using the same as well as methods for phase management and/or for power factor correction (PFC) are disclosed. Referring to FIG. 1 and FIG. 2, a multiple phase, multiple stage power converter 10 and phase management circuitry 20 for the same are, respectively, shown. The multiple phase, multiple stage power converter 10 includes a first PFC pre-regulator 12 and an additional PFC pre-regulator 14 for each additional desired phase and a step down converter 16 at the Stage 2. The first PFC pre-regulator 12 and an additional PFC pre-regulator 14 are interleaved in the front end of the power converter 10. The step down converter is electrically coupled to both of the first PFC pre-regulator 12 and each additional PFC pre-regulator 14.

The phase management circuitry 20 is adapted to selectively turn ON and turn OFF each additional PFC pre-regulator 14 of the second phase (Phase 2) and any additional phase(s). More specifically, the phase management circuitry 20 is adapted to selectively turn ON and turn OFF each additional PFC pre-regulator 14 based on an average current sense signal ($V_{RS}$) developed across the current sense resistor 17 of the second stage (Stage 2). Indeed, advantageously, since the total output ($V_{BOOST}$) generated by the interleaved converters 12 and 14 is well regulated, the average current sense signal ($V_{RS}$) developed across the current sense resistor 17 provides a measure of the average output power of the power converter 10. Although the total output is referred to as a $V_{BOOST}$, connoting a boost converter, the invention is not to be construed as being limited to interleaved boost converters. Rather, the present invention could also be applied to any multiple node power stage converters, e.g., buck converters, fly-back converters, and the like.

Because the total output ($V_{BOOST}$) is well regulated and because the average current sense signal ($V_{RS}$) provides a measure of the average output power of the power converter 10, the average current sense signal ($V_{RS}$) of the power converter 10 can be used to control the phase management circuitry 20. More specifically, the average current sense signal ($V_{RS}$) developed across the step down converter's 16 current sense resistor 17 can be used by the phase management circuitry 20 to turn ON each of the additional PFC pre-regulator(s) 14 during periods of relatively heavy power loading and to turn OFF the additional PFC pre-regulator(s) 14 during periods of relatively light power loading. A relatively light power load is a power load that is less than about 30 percent of the total output power.

The phase management circuitry 20 shown in FIG. 2 is for a two phase interleaved power converter 10. However, the principles and techniques disclosed herein also are applicable for multiple phase interleaved PFC control. The phase management circuitry 20 includes a filtering unit 22, an amplifying unit 24, a comparing device 26, and a gate driving integrated circuit 28. All or some portions of the phase management circuitry 20 can be integrated into the gate driver 28 shown in FIG. 1, into the interleaved PFC controller 18 shown in FIG. 1 or can be a stand alone device.

Referring to FIG. 2, the filtering unit 22 is structured and arranged to produce a DC voltage (V1) from the average current sense signal ($V_{RS}$) across the current sense resistor 17. The filtering unit 22 can include a resistive element (R1) and a capacitive element (C1) that are structured and arranged to form a low pass filter, e.g., a low pass filter having a low frequency pole at approximately 273 Hz.

Because the magnitude of the DC voltage (V1) is generally less than 1V, an amplifying unit 24 is desired. The amplifying unit 24 is adapted to amplify the DC voltage (V1) to a gained up average current sense signal (V2) that can be more easily monitored and compared to a reference voltage (V3). The amplifying unit 24 can be structured and arranged to include, for example, electrical components such as a non-inverting differentiating amplifier (A1) and a feedback network that includes resistive elements (R3 and R2).

The comparing device 26, e.g., a hysteretic comparator, is adapted to generate logic high (HI) or low (LO) signals (V4) for enabling and disabling the additional PFC pre-regulator 14 based on a comparison between the gained up average current sense signal (V2) and a reference voltage (V3). The comparing device 26 can include an inverting differential amplifier (A2) and a feedback network that includes resistive elements (R5 and R6). A bias voltage ($V_{BIAS}$) and resistive elements (R4 and R5) can be used to control the magnitude of the reference voltage (V3).

The logic high (HI) or low (LO) signals (V4) generated by the comparing device 26 are provided as input to the gate driving integrated circuit 28. Optionally, resistive elements R7 and R8 can be included to form a voltage divider, to attenuate the logic high (HI) or low (LO) signals (V4), to protect the gate driving integrated circuit 28.

The divided voltage (V4) and a gate driving control signal ($V_{GD2}$) generated by the interleaved PFC controller 18 are introduced as input to a logic device, e.g., an AND gate 29, in a gate driving integrated circuit 28. Accordingly, the gate driving integrated circuit 28 is structured and arranged to activate, i.e., turn ON, and deactivate, i.e., turn OFF, the switching device 30 of the second PFC pre-regulator 14 based on the logic high (HI) or low (LO) signals (V4) of the comparing device 26.

When output (V4) generated by the hysteretic comparator 26 is a logic high (HI), the front end of the power converter 10 operates in a single phase mode of operation, which means that the gate driving integrated circuit 28 will open, i.e., turn OFF, the gate of the switching device 30 so that only the first PFC pre-regulator 12 contributes to the boost voltage ($V_{BOOST}$) at the second stage (Stage 2). Alternatively, when output (V4) generated by the hysteretic comparator 26 is a logic low (LO), the power converter 10 operates in a multi-phase mode of operation, i.e., the power converter 10 will operate in multiple phases. More particularly, the gate driving integrated circuit 28 will close, i.e., turn ON, the gate of the switching device 30 of the additional PFC pre-regulator 14 so that both the first PFC pre-regulator 12 and the additional PFC pre-regulator 14 contribute to the boost voltage ($V_{BOOST}$) at the second stage (Stage 2).

EXAMPLES

A power converter 10 and phase management circuitry 20 therefor were evaluated in a 250 W application in which the boost voltage ($V_{BOOST}$) was 390V. The step down converter 16 was theoretically switching at 100 kHz. The current sense resistor 17 of the step down converter 16 was arbitrarily established at 0.33 ohms($\Omega$). The bias voltage ($V_{BIAS}$) was set to 12V.

The phase management circuit 20 was programmed to turn OFF the second (Phase 2) PFC pre-regulator 14 when the power supply is operating at less than 29% of the power converter's rated power and to turn ON the second (Phase 2) PFC pre-regulator 14 when the step down converter 16 is operating at greater than 32% of the power supply's rated power.

As shown in the calculations below, resistive element R3 of the amplifying unit 24 is sized to amplify the average current sense signal and, moreover, is selected so that gained up average current sense signal (V2) will operate between 0 and 10V. In order for the circuitry to turn ON and turn OFF the gate of the switching device 30 of the second PFC pre-regulator 14 (Phase 2), the efficiency (η) of the second power stage should be taken into consideration. The efficiency of the second stage is assumed to be 86%. Accordingly, as shown below, resistive element R3 would need to be 39 kΩ based on load demands and the step down converter's 16 efficiency.

$$V1 = \frac{P_{OUT}R_S}{V_{BOOST} \times \eta} = \frac{250\,W \times 0.33\,ohm}{390\,V \times 0.86} \approx 0.25\,V$$

$$R2\left(\frac{V2}{V1} - 1\right) = R3 = 1\,kohm\left(\frac{10\,V}{0.25\,V} - 1\right) = 39\,kohm$$

As shown in the calculations below, resistive element R5 of the comparing device 26 is sized to select the approximate power level at which the gate of the switching device 30 of the second (Phase 2) PFC pre-regulator 14 will be disabled, i.e., when V2=V3. Accordingly, in this example, resistive element R5 was selected so that the switching device 30 of the second (Phase 2) PFC pre-regulator 14 would be turned OFF at a power level of approximately 30% of the full load power. A standard value resistor of 3.3 kΩ was chosen for R5.

$$V3 = \frac{P_{OUT}R_S}{V_{BOOST}} \frac{R3}{R1} \frac{\%\,Load}{100} = \frac{250\,W \times 0.39\Omega}{390\,V} \times \frac{39\,k\Omega}{1\,k\Omega} \times \frac{30}{100} = 2.925\,V$$

$$R5 = \frac{R4 \times V2}{(V_{BIAS} - V3)} = \frac{10\,k\Omega \times 2.925\,V}{12\,V - 2.925\,V} = 3.2\,k\Omega$$

Resistor R6 of the comparator device 26 sets up the converter hysteresis and can be adjusted for an individual application.

$$Hyst = V_{BIAS}\left(\frac{\frac{R5 \times R6}{R5 + R6}}{R4 + \frac{R5 \times R6}{R5 + R6}} - \frac{R5}{R5 + \frac{R4 \times R6}{R4 + R6}}\right) =$$

$$12\,V\,(0.242 - 0.266) = -288\,mV$$

As shown above, in this example, the converter had roughly 288 mV of hysteresis. Thus, the switching device 30 of the second PFC pre-regulator 14 is designed to turn ON when the power converter 10 is operating at 32% of its rated output power and to turn OFF when operating below 29% of the power converter's 10 rated output power.

Results of Computer Modeling

A simplified SPICE model was simulated to evaluate the exemplary phase management circuitry 20. The output power (POUT) was varied from 0 W to 250 W and back to 0 W over a 40 ms period.

Figure 3:
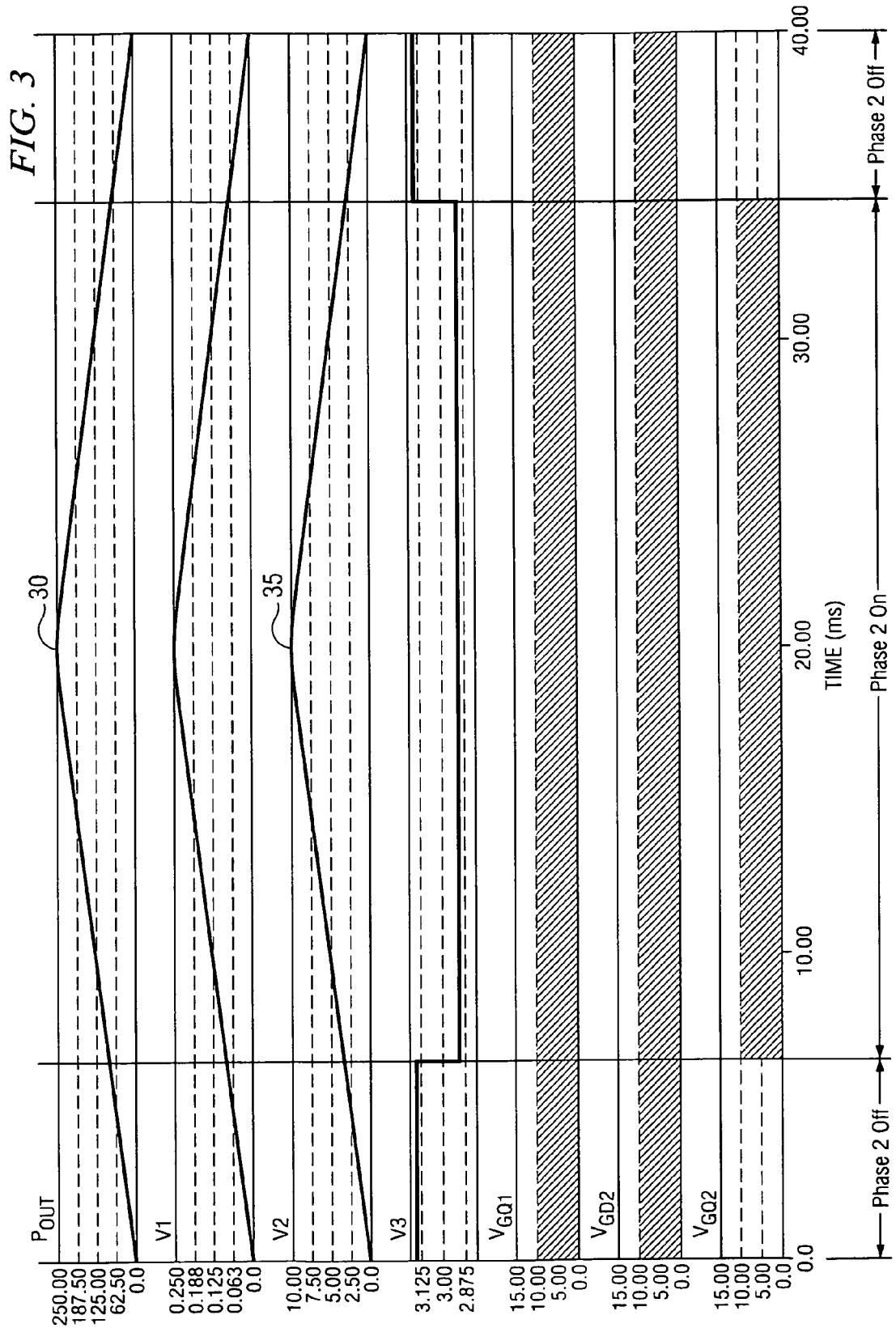
FIG. 3 shows illustrative waveforms resulting from the phase management circuitry.

Referring to FIG. 3, the resulting waveforms for the output power (POUT), the DC voltage of the average current sense signal (V1), the gained up average current sense signal (V2), the reference voltage (V3), the voltage at the gate of switching device 13 of the first PFC pre-regulator 12 (VGQ1), the gate drive signal at the gate of switching device 30 of the second PFC pre-regulator 14 (VGD2), and the voltage at the gate of switching device 30 of the second PFC pre-regulator 14 (VGQ2) are shown.

As is evident from the waveform of the voltage at the gate of switching device 30 of the second PFC pre-regulator 14 (VGQ2), the second PFC pre-regulator 14 turns ON when the gained up average current sense signal (V2) was greater than 32% of its maximum programmed value of 10V and turned OFF when the gained up averaged current sense signal (V2) was approximately 29% of its maximum programmed value of 10V. Referring to the output power (POUT) waveform, due to time delays, e.g., delays caused by the low pass filter 22, the second PFC pre-regulator 14 turned ON at 82 W and turned OFF at 70 W, which are approximately 33% and 28% of the supply's 10 rated output power. The time delay is shown in the offset of the peaks of the POUT waveform 30 and the V2 waveform 35. The maximum time delay caused by the filter 22 is less than 1.1 msec, which only had a minor effect on the simulated system.

It will be apparent to those of ordinary skill in the art that modifications to and variations of the above-described system and method may be made without departing from the inventive concepts described herein. Accordingly, the invention should not be controlled except by the scope and spirit of the appended claims.

What I claim is:

1. A method of phase management to reduce switching losses in a power converter, the power converter including a first power factor correction (PFC) pre-regulator and at least one additional interleaved PFC pre-regulator and a step down converter that is electrically coupled to the first PFC pre-regulator and to each of the at least one interleaved PFC pre-regulator, the method comprising:
   measuring an average input power at the step down converter including measuring an average current through a current sense device to generate an average current signal;
   comparing the average current signal to a reference;
   generating an output based on the comparison;
   disabling each of the at least one additional interleaved PFC pre-regulator when output power generated by the step down converter is less than a first pre-designated rated power level as determined when the output is less than a first predetermined level; and
   enabling each of said at least one additional interleaved PFC pre-regulator when output power generated by said step down converter is greater than a second pre-designated rated power level as determined when the output exceeds a second predetermined level.

2. The method as recited in claim 1, wherein measuring the average input power at the step down converter includes sensing an average current through a current sense resistor.

3. The method as recited in claim 2 further comprising:
   comparing a voltage based on the average current across the current sense resistor to a bias voltage;
   generating an output based on the comparison.

4. The method as recited in claim 1, wherein comparing includes using a hysteretic comparator.

5. The method as recited in claim 1, wherein disabling and enabling include:
   driving said power converter in single phase operation using the first PFC pre-regulator when said at least one additional interleaved PFC pre-regulator is disabled; and
   driving said power converter in multiple phases when said at least one additional interleaved PFC pre-regulator is enabled.

6. A method for power factor correction, the method comprising:
   interleaving a first power factor correction (PFC) pre-regulator with at least one additional PFC pre-regulator;
   electrically coupling a step down converter having a current sense resistor to the first PFC pre-regulator and to each of the at least one additional PFC pre-regulator;

sensing an average current across the current sense resistor; and turning ON and OFF each of the at least one additional PFC pre-regulator based on the average current across the current sense resistor, wherein turning ON and OFF each of the at least one additional PFC pre-regulator based on the average current across the current sense resistor includes:

comparing a voltage based on the average current across said current sense resistor to a bias voltage;

generating an output based on the comparison;

disabling each of the at least one additional PFC pre-regulator when the output is less than a first pre-determined rated output power; and enabling each of the at least one additional pre-regulator when the output exceeds a second pre-determined rated output power.

7. The method as recited in claim 6, wherein sensing the average current across the current sense resistor includes measuring average input power at an input of the step down converter.

8. The method as recited in claim 6, wherein comparing a voltage based on the average current across said current sense resistor to a bias voltage is performed using a hysteretic comparator.

9. A power factor correction device comprising:
a first power factor correction (PFC) pre-regulator;
at least one additional PFC pre-regulator that is interleaved with the first PFC pre-regulator;
a step down converter having a current sense resistor device for measuring an average current to generate an average current signal at an input that is electrically coupled to the first PFC pre-regulator and to each of the at least one additional PFC pre-regulator; and
a comparator receiving the average current signal for selectively disabling at least one of the interleaved PFC pre-regulator by disabling each of the at least one additional interleaved PFC pre-regulator when output power generated by the step down converter is less than a first pre-designated rated power level as determined when the output is less than a first predetermined level; and
enabling each of said at least one additional interleaved PFC pre-regulator when output power generated by said step down converter is greater than a second pre-designated rated power level as determined when the output exceeds a second predetermined level.

10. The device as recited in claim 9, wherein the average current signal developed across the current sense device is developed across a resistor at an input of the step down converter.

11. The device as recited in claim 9, wherein the comparator is a hysteretic comparator.

12. A phase management circuit for power factor control of a multiple stage power converter having a first power factor correction (PFC) pre-regulator interleaved to at least one additional PFC pre-regulator for each phase and a step down converter having a current sense resistor that is electrically coupled to the first PFC pre-regulator and to each of the at least one additional PFC pre-regulator, the circuit comprising:
a low pass filter for filtering an average voltage across the current sense resistor and for generating an average current sense signal;
a comparator for comparing the average current sense signal to a bias voltage and for generating an output based thereon; and
a gate driver for each phase for driving a corresponding one of the at least one additional PFC pre-regulator.

13. The circuit as recited in claim 12, wherein each gate driver is adapted to disable its corresponding additional PFC pre-regulator if the output generated by the comparator is less than a first pre-determined rated power level.

14. The circuit as recited in claim 12, wherein each gate driver is adapted to enable its corresponding additional PFC pre-regulator if the output generated by the comparator is greater than a second pre-determined rated power level.

15. The circuit as recited in claim 12, wherein the comparator is a hysteretic comparator.

16. The circuit as recited in claim 12, wherein each gate driver is adapted to enable its corresponding additional PFC pre-regulator based on power supply loading at the step down converter.

* * * * *